United States Patent
Kataoka et al.

(10) Patent No.: US 7,031,674 B2
(45) Date of Patent: Apr. 18, 2006

(54) RADIO TERMINAL AND FAULT DETECTION METHOD

(75) Inventors: Ryohei Kataoka, Kariya (JP); Hisashi Takeshita, Chiyoda-ku (JP); Hiroyuki Itazu, Chiyoda-ku (JP); Mio Okamoto, Chiyoda-ku (JP)

(73) Assignees: DENSO Corporation, Kariya (JP); NTT DoCoMo, Inc., Tokyo (JP)

( * ) Notice: Subject to any disclaimer, the term of this patent is extended or adjusted under 35 U.S.C. 154(b) by 556 days.

(21) Appl. No.: 10/261,154

(22) Filed: Sep. 30, 2002

(65) Prior Publication Data

US 2003/0139154 A1    Jul. 24, 2003

(30) Foreign Application Priority Data

Jan. 22, 2002    (JP)    ............... 2002-013193

(51) Int. Cl.
 *H04B 17/00*    (2006.01)
(52) U.S. Cl. ............... 455/115.1; 455/115.2; 455/127.1; 455/522; 370/318
(58) Field of Classification Search ............ 455/115.1, 455/115.2, 115.3, 127.1, 130, 134, 135, 277.1, 455/67.11, 67.13, 67.14, 500, 501, 513, 522, 455/95

See application file for complete search history.

(56) References Cited

U.S. PATENT DOCUMENTS

| | | | | |
|---|---|---|---|---|
| 5,898,682 | A * | 4/1999 | Kanai | 370/331 |
| 6,466,628 | B1 * | 10/2002 | Kim | 375/297 |
| 2002/0141478 | A1 * | 10/2002 | Ozluturk et al. | 375/130 |
| 2004/0266457 | A1 * | 12/2004 | Dupray | 455/456.5 |

FOREIGN PATENT DOCUMENTS

| | | |
|---|---|---|
| EP | 0 975 098 A2 | 1/2000 |
| JP | 8-335904 | 12/1996 |

OTHER PUBLICATIONS

Office Action dated Sep. 30, 2003 in Japanese application No. JP2002-013193 and English translation.

* cited by examiner

*Primary Examiner*—Edward F. Urban
*Assistant Examiner*—Thuan T. Nguyen
(74) *Attorney, Agent, or Firm*—Harness, Dickey & Pierce, PLC

(57) ABSTRACT

Method for detecting transmission power faults in cellular telephones without detecting transmission power. A microcomputer compares a criteria B with an absolute value |Pi−Pc| of the differential between initial transmission power value Pi and transmission power concentration value PC. A transmission power fault is determined to have occurred when the absolute value 51 Pi−Pc| is larger than criteria B (|Pi−Pc|>B), so transmission power faults can be detected without detecting the transmission power.

9 Claims, 9 Drawing Sheets

| SIR | TRANSMISSION POWER INITIAL VALUE |
|---|---|
| ○○○ | △△dbm |
| △△△ | ○×dbm |
| ××× | ××dbm |
| □□□ | ○○dbm |
| ×□○ | △□dbm |
| ⋮ | ⋮ |

| TRANSMISSION POWER SETTING | A/D OUTPUT TOLERANCE RANGE |
|---|---|
| ○○○ | 5~7 |
| △△△ | 10~12 |
| ×׌ | 15~17 |
| ⋮ | ⋮ |
| □□ | 21~24 |
| □× | 26~28 |

RADIO TERMINAL AND FAULT DETECTION METHOD

CROSS REFERENCES TO RELATED APPLICATIONS

This application relates to and incorporates by reference Japanese patent application number 2002-13193, which was filed on Jan. 22, 2002.

BACKGROUND OF THE INVENTION

The present invention relates to a radio terminal and fault detection method for detecting transmission power abnormalities.

Figure 10:
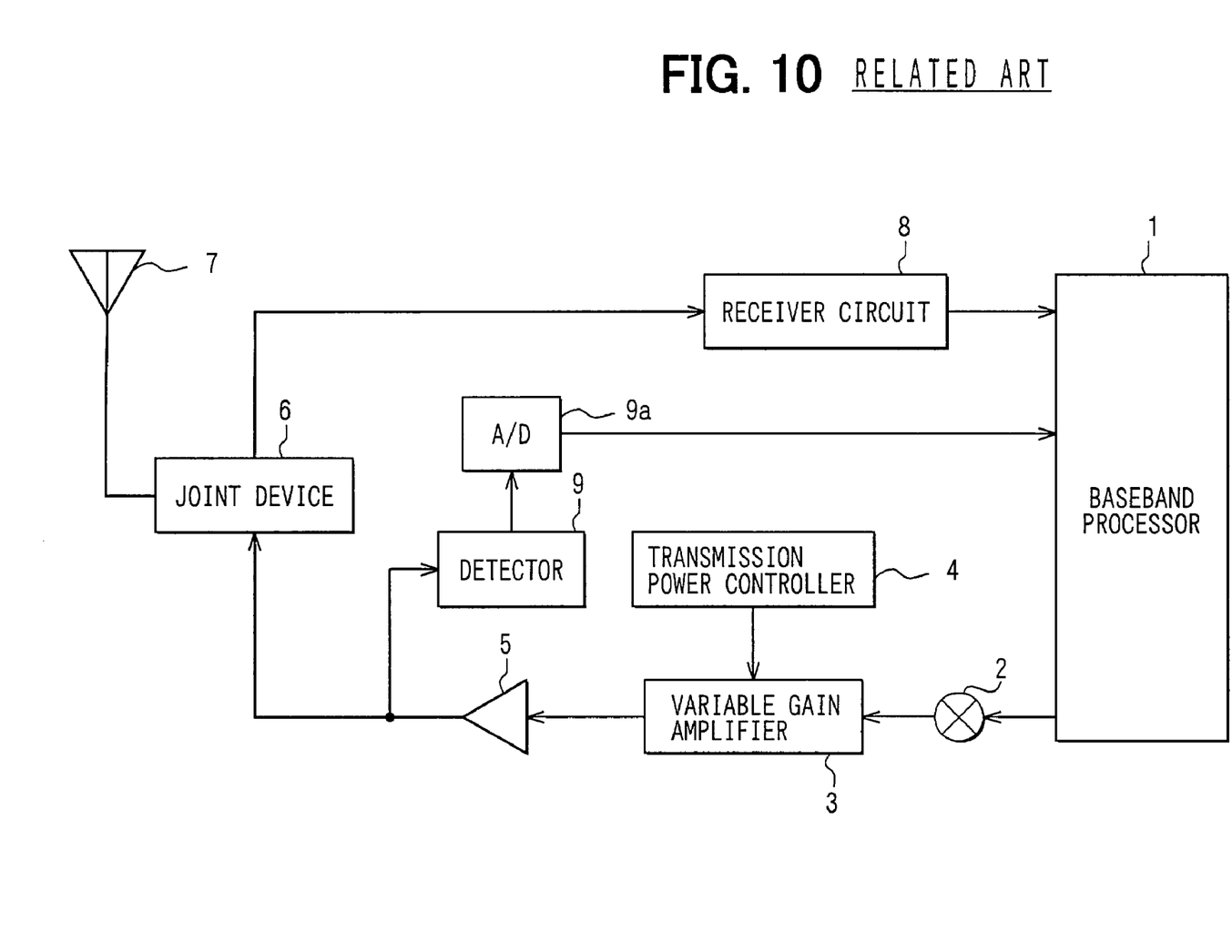
FIG. 10 is a block diagram showing the electrical circuit configuration of the cellular telephone of the related art.

The general electrical circuit for a known cellular telephone is shown in FIG. 10. When the baseband processor 1 outputs a transmission signal, that transmission signal is input to a variable gain amplifier 3 by way of a modulator 2. The variable gain amplifier 3 then performs power amplification according to the gain output from the transmission power controller 4 and outputs a power amplification signal. When the power amplification signal is input to a transmission power amplifier 5, the transmission power amplifier 5 amplifies the power of the power amplification signal and outputs this signal to an antenna 7 by way of a joint device 6. The antenna 7 thus transmits the power amplification signal to a base station utilizing the radio waves as a medium.

The gain of the variable gain amplifier 3 is set based on the downlink communication signal transmitted from the base station by the transmission power controller 4. In other words, this gain and the output power from the variable gain amplifier 3 are controlled by the base station. The transmission power output from the transmission power amplifier 5 is also controlled by the base station.

However, when a fault occurs in the variable gain amplifier 3, the transmission power controller 4, the transmission power amplifier 5, the joint device 6, or the antenna 7, the transmission power for transmission to the base station is a value unrelated to control by the base station. In other words, a transmission power fault will occur.

Figure 11:
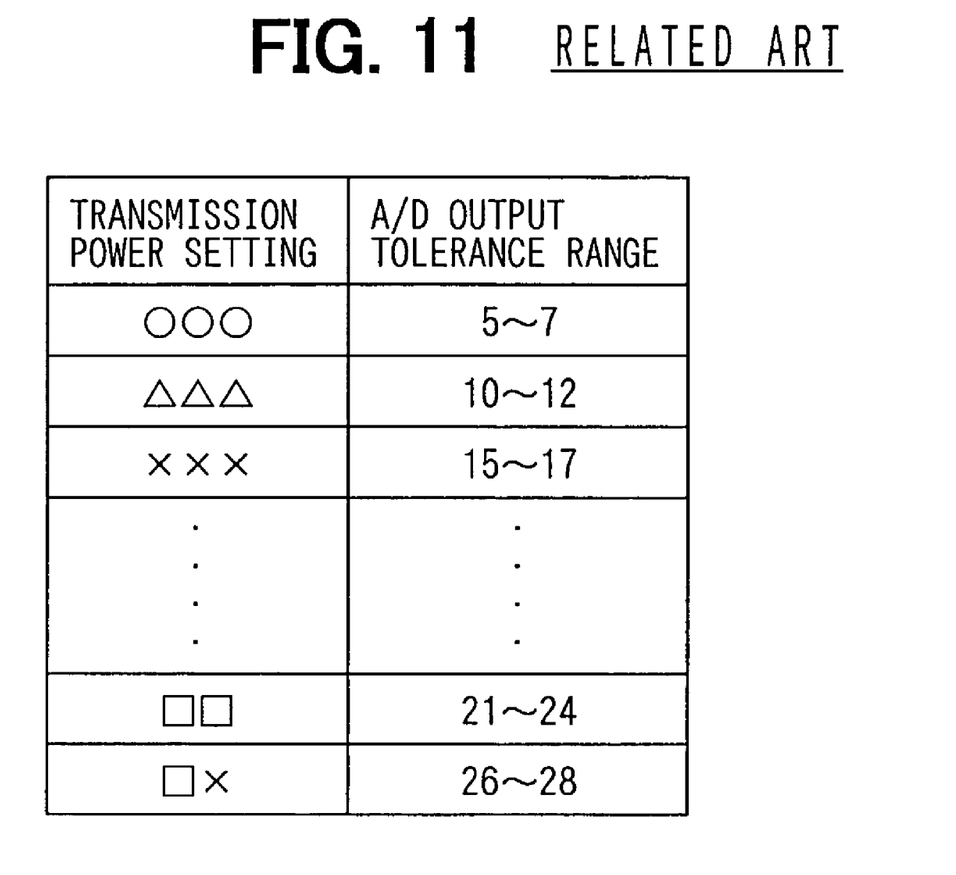
FIG. 11 is a table showing the relation between the transmission power setting value and the A/D converter output tolerance range.

To detect these kinds of transmission power faults, a detector circuit 9 is added to the final stage of the transmission power amplifier 5 to monitor the transmission power output of the transmission power amplifier 5. The detector circuit 9 outputs the transmission power signal from the transmission power amplifier 5 to the baseband processor 1 by way of an A/D converter 9a. The A/D converter 9a output tolerance range (values) are stored in the baseband processor 1 to correspond one-to-one with the transmission power value settings as shown in FIG. 11. The baseband processor 1 can determine if a transmission power fault has occurred by determining whether the output from A/D converter 9a has deviated from the output tolerance range. Service personnel can, for example, detect a transmission power fault by using a cellular telephone without having to use dedicated test equipment.

When, for example, there is an extremely large differential between maximum transmission power and minimum transmission power, as in CDMA (Code Division Multiple Access) systems, a detector circuit 9 for monitoring transmission power, used as a circuit for detecting the above described transmission power faults, must be capable of detecting faults over an extremely wide range.

SUMMARY OF THE INVENTION

In view of the above points, the present invention has the object of providing a radio terminal capable of detecting power transmission power faults without detecting the transmission power.

The radio terminal of the present invention was developed in consideration of the fact that transmission power becomes concentrated when the radio terminal is placed in a specified location and power transmission is controlled based on control signals from the base station.

More specifically, in a first aspect of the invention, a radio terminal for transmitting to a base station with transmission power controlled by a base station has means, for determining and storing the transmission power concentration value when the transmission power controlled by the base station has been concentrated, and a first fault detecting means, for detecting transmission power faults based on the stored concentration value.

Faults in the transmission power are detected in this way, based on the transmission power concentration value so power transmission faults can be detected without detecting the transmission power.

In a second aspect, the radio terminal includes an output means, for outputting the signal for transmission to the base station at a controlled transmission power, a signal detecting means, for detecting the signal output from the output means, and a second fault detecting means, for detecting transmission power faults based on the signal detected by the signal detecting means when the controlled transmission power is capable of being detected by the signal detecting means. The first fault detecting means may be used for detecting faults in the transmission power when the controlled transmission power cannot be detected by the signal detecting means.

In a third aspect, the transmission power is controlled based on a specifier signal for specifying an increase or reduction in the initial transmission power value by the base station and an initial transmission power value specified from the base station, and the first fault detecting means detects a fault in the transmission power when the relation between the stored concentration value and the specified initial transmission power value deviates from a specified relation.

In a fourth aspect of the invention, the transmission power may be calculated based on the initial transmission power value and the specifier signal.

In a fifth aspect of the invention, the first detecting means detects a fault in the power transmission when the difference between the concentration value and the specified initial transmission power value becomes larger than a threshold value, since the relation between the concentration value and the specified initial transmission power value has deviated from the specified relation.

In a sixth aspect of the invention, the initial transmission power value is set based on a signal sent from the base station. Prior to establishing a concentration value for the transmission power, a transmission power concentration value is found each time the initial transmission power value is set. Further, the radio terminal includes a means for establishing threshold values according to each difference that is found between the initial transmission power value and the concentration value.

If a means to establish threshold values according to each difference that is found is used in this way, then there is no need for example to store threshold values ahead of time in the radio terminal prior to shipping it.

In a seventh aspect of the invention, the radio terminal notifies the user that a transmission power fault has occurred when the transmission power fault is detected by either the first or the second fault detecting means.

An eighth aspect of the invention is a fault detection method for a radio terminal for transmitting to a base station, in which transmission power is controlled by a base station. The method includes storing a concentration value for the concentrated transmission power, when the transmission power is a controlled transmission power concentrated by a base station, and detecting faults in transmission power based on the stored concentration value.

Transmission power faults are detected based on the transmission power concentration value, so that transmission power faults can be detected without detecting the transmission power, as in the first aspect of the invention.

DETAILED DESCRIPTION OF THE PREFERRED EMBODIMENTS

Figure 1:
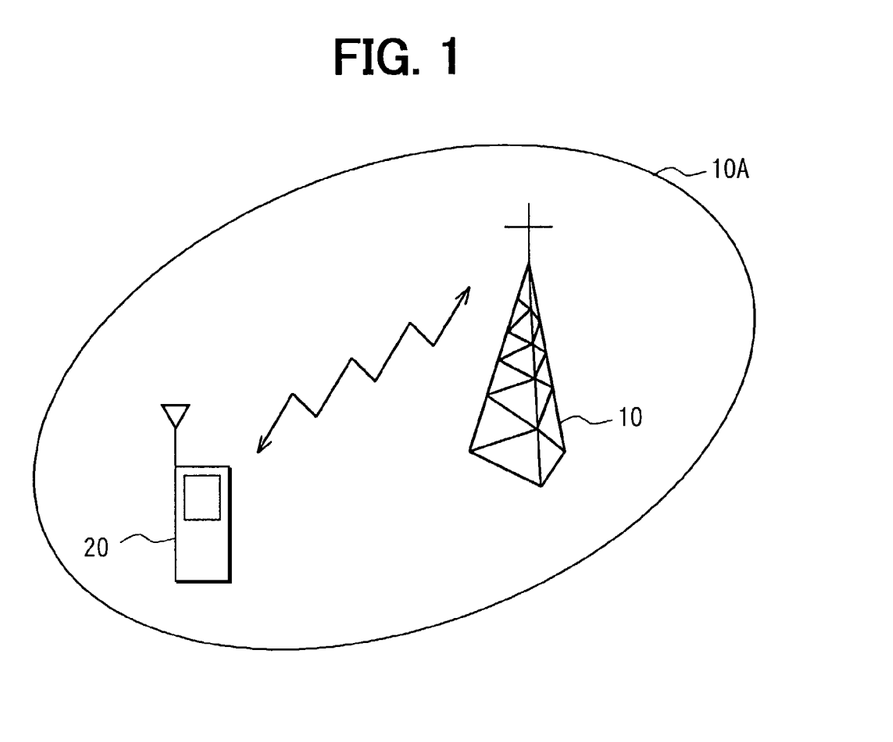
FIG. 1 is a diagram of a CDMA (Code Division Multiple Access) type cellular telephone system of the present invention.

The embodiment of the CDMA (Code Division Multiple Access) type cellular telephone system of the present invention is shown in FIG. 1.

FIG. 1 illustrates the structure of the cellular telephone system. The cellular telephone system includes a base station 10 and a cellular telephone 20. The base station 10 generates a wireless area 10A. When positioned within the wireless area 10A the cellular telephone system 20 receives a downlink signal from the base station 10 and sends an uplink signal to the base station 10.

The uplink communication signal here includes a pilot signal, a communication power control bit (hereafter TPC-U) and a data signal, among others. The TPC-U is for instructing the cellular telephone 20 to raise or lower the transmission power value to the base station 10 by a specified power value (for example, 1 dBm).

The downlink communication signal contains a pilot signal, a communication power control bit (hereafter TPC-D) and a data signal, etc. The TPC-D is for instructing the base station 10 to raise or lower the transmission power value to the cellular telephone 20 by a specified power value (for example 1 dBm). The offset command, as described later, is a command for the base station 20 to perform correction using the initial transmission power value established by the cellular telephone 20.

Figure 2:
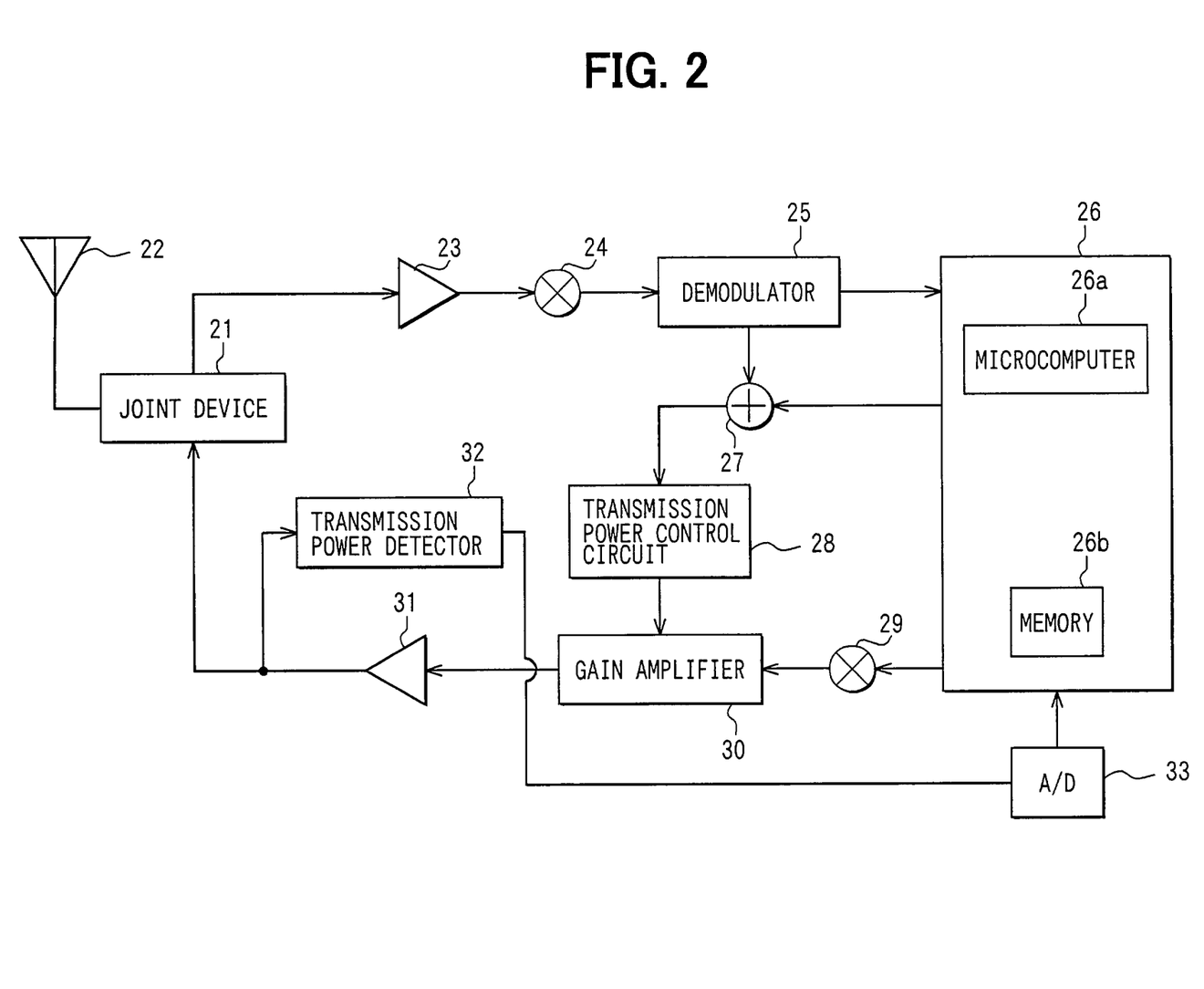
FIG. 2 is a block diagram showing the cellular telephone electrical circuit structure of the invention.

The electrical circuit structure of the cellular telephone 20 is described next with reference to FIG. 2.

The cellular telephone 20 includes a joint device 21, a transceiver antenna 22, a receiver amplifier 23, a mixer 24, a demodulator 25, a baseband processor 26, an adder 27, a transmission power control circuit 28, a modulator 29, a variable gain amplifier 30, a transmission amplifier 31, a transmission power detector 32 and an A/D converter 33. The baseband processor 26 has a microcomputer 26a and a memory 26b.

The joint device 21 outputs a downlink signal received from the transceiver antenna 22 to the receiver antenna 23. The receiver amplifier 23 power amplifies the downlink signal and outputs the amplified signal as an amplified receive signal. The mixer 24 down-converts the amplified receive signal. The demodulator 25 extracts the TPC-D from the mixer 24 output, performs reverse diffusion and maximum rate synthesis processing of the output from the mixer 24, and outputs the demodulated signal.

The initial transmission power value output from the baseband processor 26 and the TPC-D extracted by the demodulator 25 are input to the adder 27. The adder 27 then outputs the initial transmission power value and TPC-D to the transmission power control circuit 28. This transmission power control circuit 28 sets the gain according to the initial transmission power value and TPC-D and outputs this established gain to the variable gain amplifier 30.

The modulator 29 performs demodulation such as diffusion on the transmission signal output from the baseband processor 26 and outputs this modulated signal. The variable gain amplifier 30 performs power amplification of the modulated signal from the modulator 29 based on the gain from the transmission power control circuit 28 and outputs a transmission power signal. The transmission amplifier 31 performs power amplification of the transmission power signal and outputs the uplink communication signal by way of the joint device 21 to the transceiver antenna 22. The transceiver antenna 22 can in this way transmit the uplink communication signal to the base station 10 using radio waves as the medium.

Figure 3:
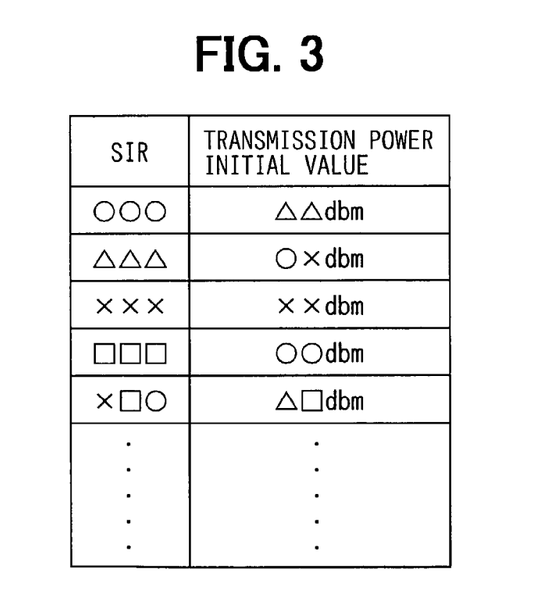
FIG. 3 is a table showing the relation between the SIR stored in the flash memory shown in FIG. 2 and the initial transmission power value.

The transmission power detector 32 contains a diode and performs half-wave rectification of the uplink communication signal from the transmission amplifier 31. The transmission power detector 32 outputs this rectified output to the A/D converter 33. The A/D converter 33 performs analog/digital conversion to convert the rectified output into a digital signal. The microcomputer 26a processes the call and also performs fault detection processing of each type to determine if there is a transmission power fault. The memory 26b is comprised of an SRAM (static RAM) and a flash memory (non-volatile memory). The SRAM stores data that accompanies the processing in the microcomputer 26a. The flash memory stores a computer program and an initial value table for establishing initial transmission power values as shown in FIG. 3. This initial value table is configured to specify each SIR (Signal-To-Interference Ratio) in a one-to-one relation with each initial transmission power value.

Figure 5:
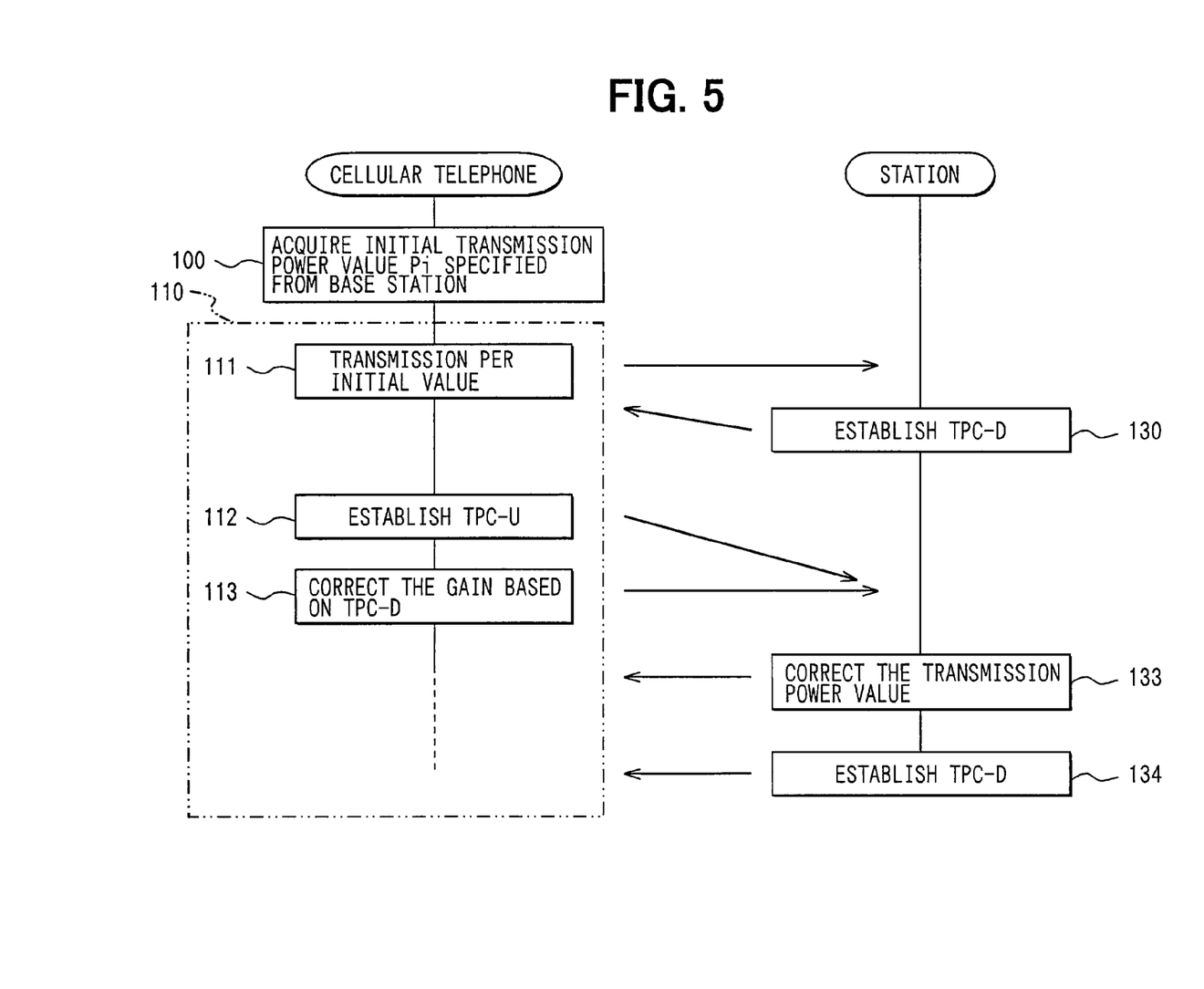
FIG. 5 is a flowchart representing a portion of the operation of the transmission power control circuit and microcomputer shown in FIG. 2.
Figure 6:
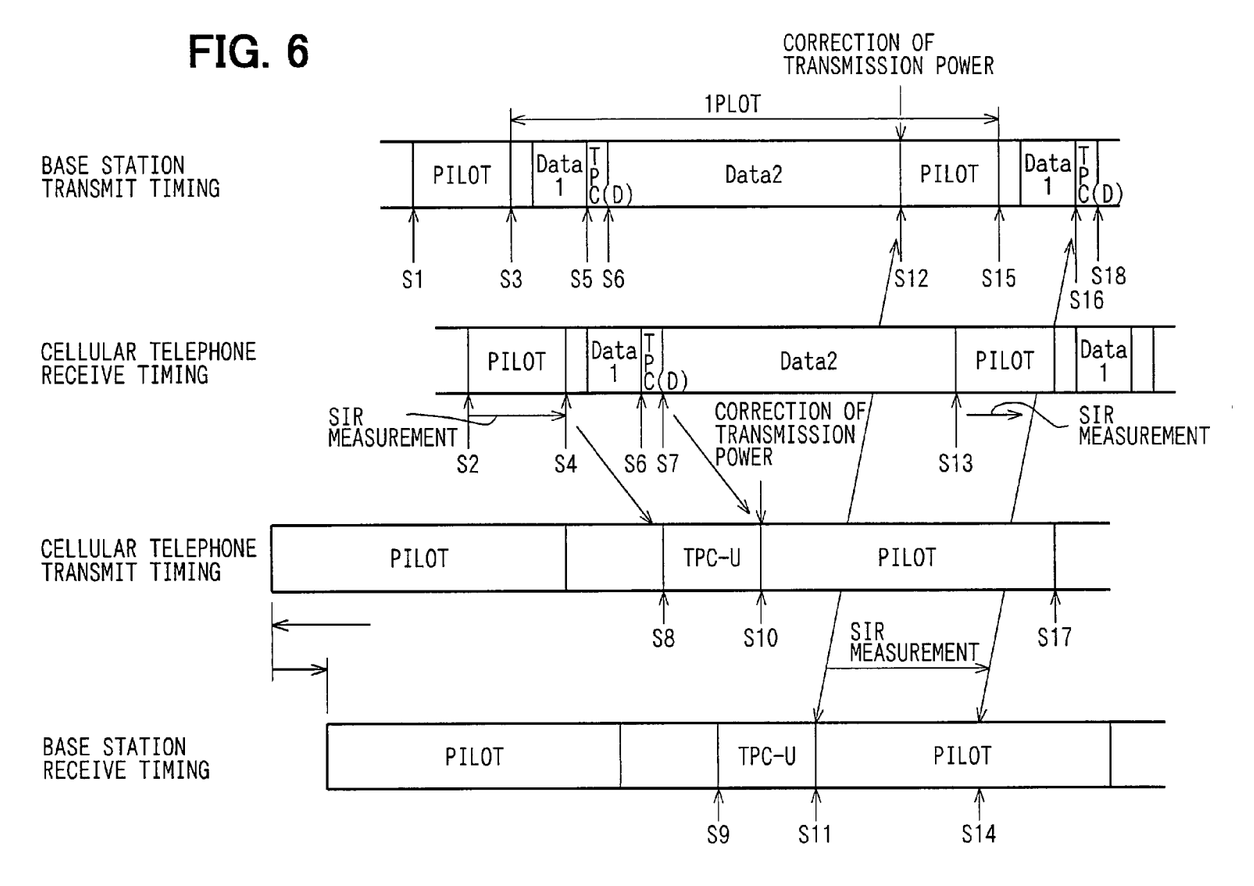
FIG. 6 is a timing chart illustrating a portion of the operation of the transmission power control circuit and microcomputer shown in FIG. 2.

The operation of the first embodiment is described as follows referring to FIG. 4 through FIG. 6.

Figure 4:
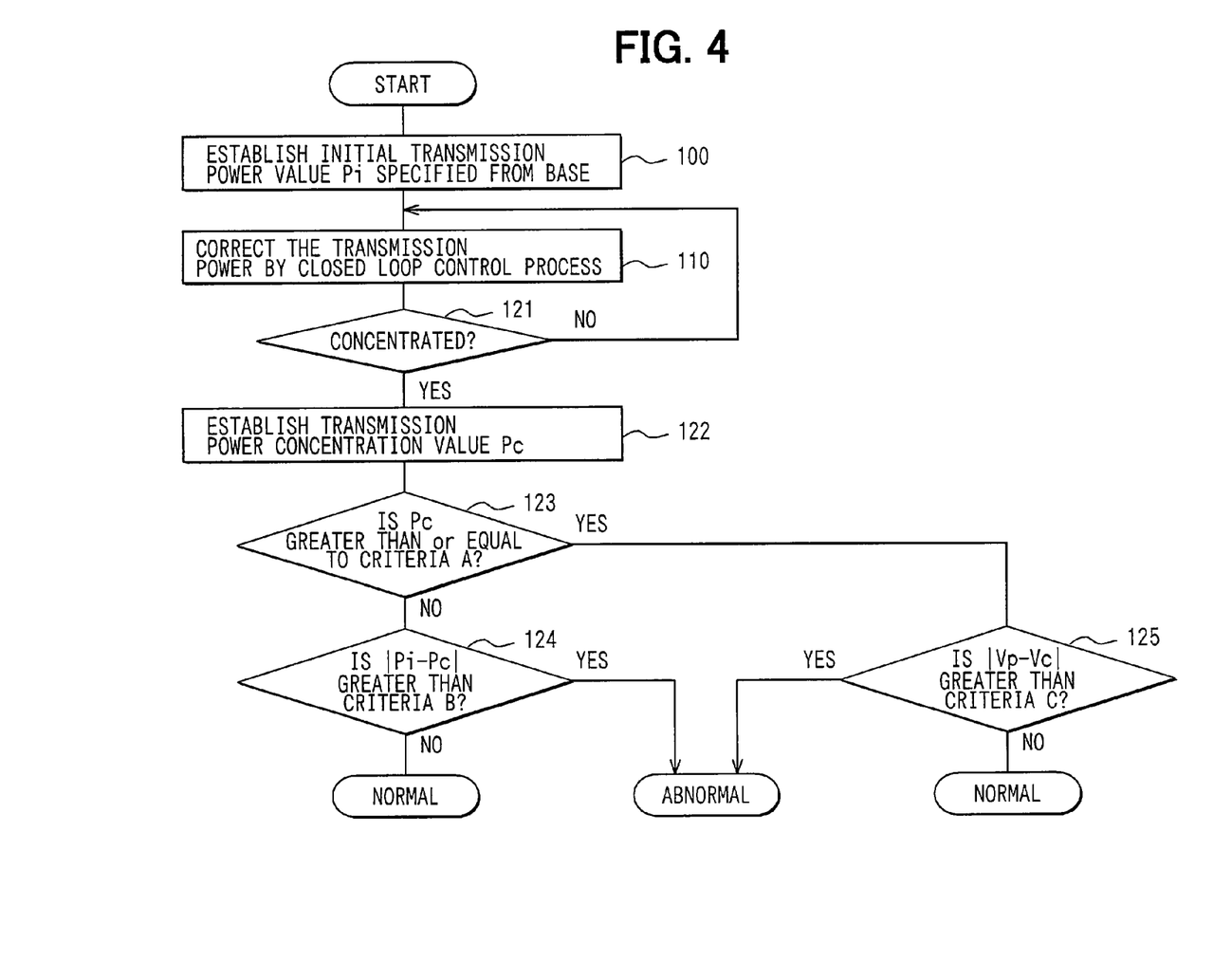
FIG. 4 is a flowchart representing a portion of the operation of the transmission power control circuit and microcomputer shown in FIG. 2.

FIG. 4 shows the fault decision processing in the microcomputer 26a. The user (or repair person) first places the cellular telephone 20 in a specified location for establishing a fixed distance between the cellular telephone 20 and the base station 10. The microcomputer 26a starts fault decision processing when a specified operation is performed on the cellular telephone 20 operating section to investigate transmission power faults.

The downlink communication signal from the base station 10 is received by way of the transceiver antenna 22. This downlink communication signal is input by way of the joint device 21, the receive amplifier 23, the mixer 24 and the demodulator 25 to the baseband processor 26.

The microcomputer 26a then finds the SIR of the pilot signal contained in the downlink communication signal. The initial transmission power value specified by this SIR is acquired from the initial value table in the flash memory of the memory 26b. In addition, the initial transmission power value Pi is established (step 100) by offsetting this acquired initial transmission power value based on an offset command contained in the downlink communication signal.

An optimal initial transmission power value for the base station 10 or (so-called) initial transmission power value Pi specified by the base station 10 can in this way be established by finding the initial transmission power value based on the SIR and offsetting this acquired initial transmission power value. This offset command is determined by the number of radio terminals within the wireless area 10a and by the wireless environment.

This initial transmission power value Pi is output to the power transmission control circuit 28 (step 110) by way of the adder 27. The transmission power control circuit 28 then starts correcting the transmission power based on the initial transmission power value Pi. This transmission power is corrected by communication with the base station 10.

The correction of transmission power by the cellular telephone 20 and the base station 10 is described next while referring to FIG. 5 and FIG. 6. The operation of the microcomputer 26a and the power transmission control circuit 28 are shown in FIG. 5. The downlink communication signal transmit timing the base station 10 is shown FIG. 6A. The downlink communication signal receive timing in the cellular telephone 20 is shown in FIG. 6B. The uplink communication signal transmission timing for the cellular telephone 20 is shown in FIG. 6C. The uplink communication signal reception timing for the base station 10 is shown in FIG. 6D.

The power transmission control circuit 28 outputs the initial gain based on initial transmission power value Pi, to the variable gain amplifier 30 (step 111). The variable gain amplifier 30 therefore performs power amplification of the modulated signal from the modulator 29 based on the initial gain to increase the transmission power. When this power amplified transmission signal is output, the transmission amplifier 31 amplifies this power amplified transmission signal and transmits an uplink communication signal by way of the joint device 21 from the transceiver antenna 22.

The base station 10 next receives the uplink communication signal and finds the pilot signal SIR contained in this uplink communication signal. The base station 10 determines the TPC-D by comparing this SIR with a specified threshold value (step 130). Here, when the SIR is larger than the specified threshold value, a TPC-D is set to instruct that transmission power value to the cellular telephone 20 be lowered by 1 dBm. However, when the SIR is smaller than the specified threshold value, then TPC-D is set to instruct that transmission power value to the cellular telephone 20 be raised by 1 dBm. The downlink signal containing the pilot signal and the TPC-D that was set in this way is sent as the designated transmission power value Rk to the cellular telephone 20.

When this downlink communication signal is received by the transceiver antenna 22, it is input by way of the joint device 21, the receiver amplifier 23, the mixer 24, and the demodulator 25 to the baseband processor 26. The microcomputer 26a then finds the SIR of the pilot signal contained in the downlink signal (See steps S2 through S4 in FIG. 6.). The microcomputer 26a compares the SIR with the specified threshold value and determines the TPC-U (step 112). Here, when the SIR is larger than the specified threshold value, a TPC-U is set to instruct that transmission power value to the base station 10 be lowered by 1 dBm. However, when the SIR is smaller than the specified threshold value, then TPC-U is set to instruct that transmission power value to the base station 20 be raised by 1 dBm. The TPC-U set in this way, is sent by way of the modulator 29, the variable gain amplifier 30, the transmission amplifier 31 and the joint device 21 from the transceiver antenna 22 (See steps S8 through S10 in FIG. 6.).

Next, the demodulator 25 extracts the TPC-D of the downlink signal from the output of the mixer 24 and outputs it to the adder 27. The adder 27 therefore outputs this extracted TPC-D and the initial transmission power value Pi of microcomputer 26a to the transmission power control circuit 28. The transmission power control circuit 28 then corrects (or compensates) the gain based on the TPC-D and initial transmission power value Pi (step 113). More specifically, if TPC-D is set to instruct that transmission power to the cellular telephone 20 be lowered 1 dBm, then the gain is corrected to lower the transmission power value 1 dBm from the prior transmission value or initial transmission power value Pi. When the TPC-D is set to instruct that transmission power to the cellular telephone 20 be raised 1 dBm, then the gain is corrected to raise the transmission power 1 dBm from the transmission initial power value Pi. The TPC-D therefore has the role of an indicator signal to specify raising or lowering the initial transmission power value Pi, or the previous transmission power value, by the base station 10.

The microcomputer 26a outputs the pilot signal as the uplink signal to the variable gain amplifier 30 by way of the modulator 29. The variable gain amplifier 30 amplifies the power of this pilot signal based on the corrected gain. Accompanying this, the output from the variable gain amplifier 30 is sent by way of the transmission amplifier 31 and the joint device 21 from the transceiver antenna 22 (See steps S10 through S17 in FIG. 6.).

Next, when the TPC-U sent from the cellular telephone 20 is received, (See S9 through S11 in FIG. 6.) the base station 10 corrects the previous transmission power value, namely the designated transmission power value Rk based on this TPC-U (step 133). The pilot signal of the downlink signal is also sent as the corrected transmission power value to the cellular telephone 20. When the base station 10 receives the pilot signal sent from the cellular telephone 20, it finds the SIR of this pilot signal (step 134). Along with this, the TPC-U in the downlink signal is sent to the cellular telephone 20 (See S16 through S18 in FIG. 6D.). An optimal transmission power is mutually obtained in this way by the base station 10 and the cellular telephone 20 mutually controlling the transmission power. This mutual control of transmission power is repeated until the microcomputer 26*a* determines as shown in step 121 of FIG. 4 that the transmission power value to send to the base station 10 is concentrated. Here, the TPC-D sent from the base station 10 is sequentially input from the demodulator 25 to the microcomputer 26*a*. The microcomputer 26*a* then sequentially stores the TPC-D in the flash memory of the memory 26*b*.

Here, as explained above, the TPC-D is set to instruct that the transmission power value be raised 1 dBm or lowered 1 dBm. Thereupon, each time a TPC-D is input the microcomputer 26*a* finds a transmission power value to transmit to the base station 10. This transmission power value is the previous transmission power value lowered 1 dBm or raised 1 dBm based on the initial transmission power value Pi and instruction set in TPC-D. This transmission power value is stored in the flash memory of the memory 26*b*.

Each time a TPC-D is input, the microcomputer 26*a* determines based on this input TPC-D and each TPC-D stored in the flash memory, whether or not there was a continuous increase or continuous decrease occurring in fixed periods in the transmission power value.

Figure 7:
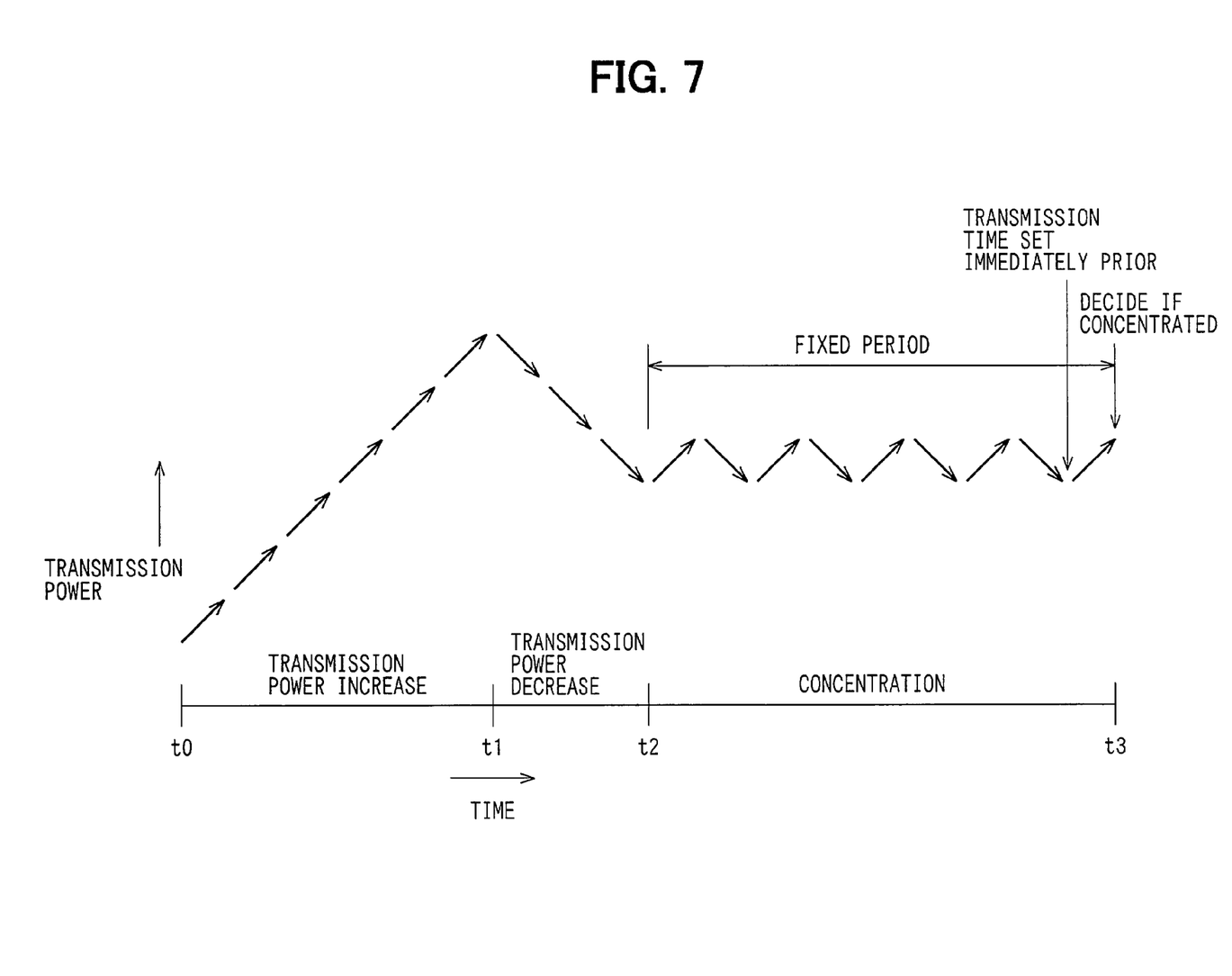
FIG. 7 is diagram illustrating a concentration of transmission power.

When increases and decreases in the transmission power value alternately occur repeatedly at fixed intervals as in t2 through t3 in FIG. 7, the microcomputer 26*a* decides that the transmission power is concentrated and stops transmitting the pilot signal and TPC-D to the base station 10. The transmission power control is thus performed between the base station 10 and the cellular telephone 20 has now ended.

In FIG. 7, the vertical axis represents the transmission power value and the horizontal axis represents time. The arrows facing upwards and to the right are increases in transmission power. The arrows facing downwards and to the right are decreases in transmission power. The example shows a continuous increase (timing t0 through t1) and a continuous decrease (timing t1 through t2) in transmission power and then the transmission power becoming concentrated. The reason the transmission power of cellular telephone 20 becomes concentrated is that the base station 10 is controlling the cellular telephone 20 transmission power while the cellular telephone 20 is at a fixed distance versus the base station 10.

Therefore, when the microcomputer 26*a* determines that the transmission power is concentrated, it (26*a*) calls up the immediately prior transmission power value that was set (prior to deciding power is concentrated) from the flash memory of the memory 26*b*. This (called up) transmission power value is established as the transmission power concentration value Pc and stored in the flash memory (step 122).

Next, the microcomputer 26*a* compares the transmission power concentration value Pc with a criteria A (step 123). Here, the criteria A is a lowest limit value detectable by the transmission power detector 32. When the transmission power concentration value Pc is below criteria A or in other words when the transmission power concentration value Pc cannot be detected by the transmission power detector 32, then a determination is made whether or not a transmission power fault has occurred based on the initial transmission power value Pi and the transmission power concentration value Pc (step 124).

In other words, along with calculating the absolute value |Pi−Pc| as the differential between initial transmission power value Pi and transmission power concentration value Pc, the microcomputer 26*a* compares the calculated absolute value |Pi−Pc| with a criteria B. When the absolute value |Pi−Pc| is smaller than the criteria B (|Pi−Pc|<B), the microcomputer 26*a* decides transmission power is correct and displays a message that transmission power is correct on a display panel (not shown in drawing). When the absolute value |Pi−Pc| is larger than the criteria B (|Pi−Pc|>B), the microcomputer 26*a* decides transmission power is abnormal and displays a message that transmission power is abnormal on a display panel. The reason that a power transmission fault (or abnormality) can be determined based on the absolute value |Pi−Pc| and criteria B is related later.

In step 123, when the transmission power concentration value Pc is larger than criteria A, in other words the transmission power concentration value Pc is detectable by transmission power detector 32, the microcomputer 26*a* then decides whether or not the output Vp from the A/D converter 33 has deviated from tolerance range, and further decides whether a power transmission fault occurred or not (step 125). In other words, the absolute value |Vp−Vc| as the differential between the output Vp from the A/D converter 33 and transmission power setting value Vc is found. When this absolute value |Vp−Vc| is less than criteria C then transmission power is determined to be correct and a message that transmission power is correct is shown on a display panel. When the absolute value |Vp−Vc| is larger than the criteria C, a transmission power abnormality (or fault) is determined to have occurred and a message that transmission power is abnormal is shown on a display panel. The criteria C is determined beforehand by experiment.

Figure 8:
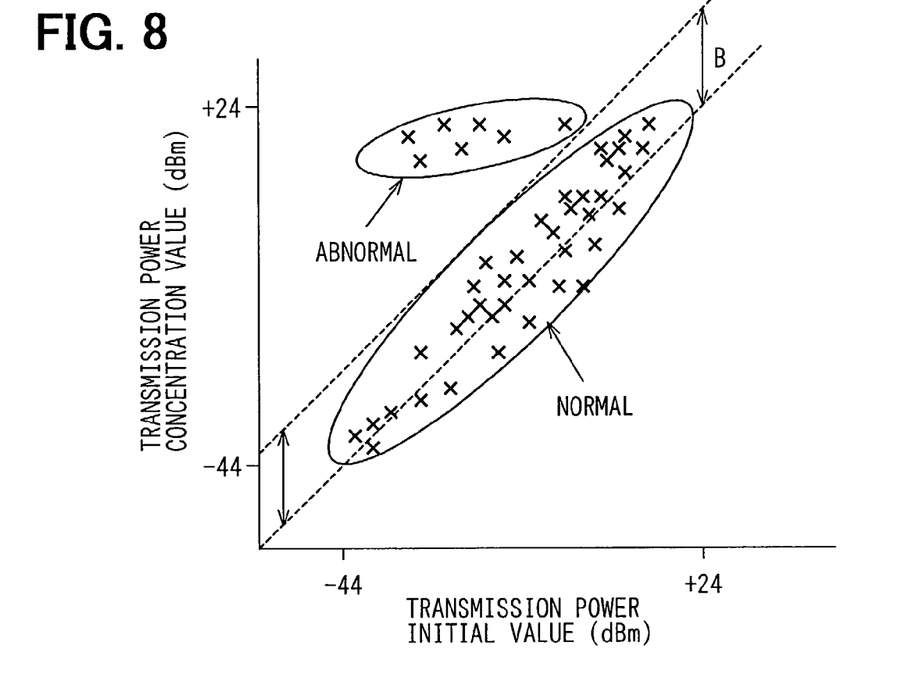
FIG. 8 is a graph illustrating a relationship between initial transmission power value and transmission power concentration value.

The reason a transmission power abnormality can be determined based on the |Pi−Pc| and criteria B is next described while referring to FIG. 8.

In FIG. 8, the relation of initial transmission power value and transmission power concentration values at points located at different distances from the base station 10 are investigated by experiment. The experiment results are plotted on a graph in FIG. 8, with transmission power concentration values plotted with X marks at each initial transmission power value setting The vertical axis on this graph represents the transmission power concentration value. The horizontal axis on the graph represents the initial transmission power value. When the transmission power is correct, an X mark is plotted near the boundary (dashed line in FIG. 8) where the transmission power concentration value matches the initial transmission power value. On the other hand, when the transmission power is abnormal, an X mark is plotted in a separate location above the boundary. Therefore when transmission power is correct, a specific correlation can be established between the transmission power concentration value and the initial transmission power value. When transmission power is abnormal, this can be clearly known because the transmission power concentration value and the initial transmission power value deviate from their correlation. The criteria B is determined in consideration of this relation between the transmission power concentration value and the initial transmission power value.

Figure 9:
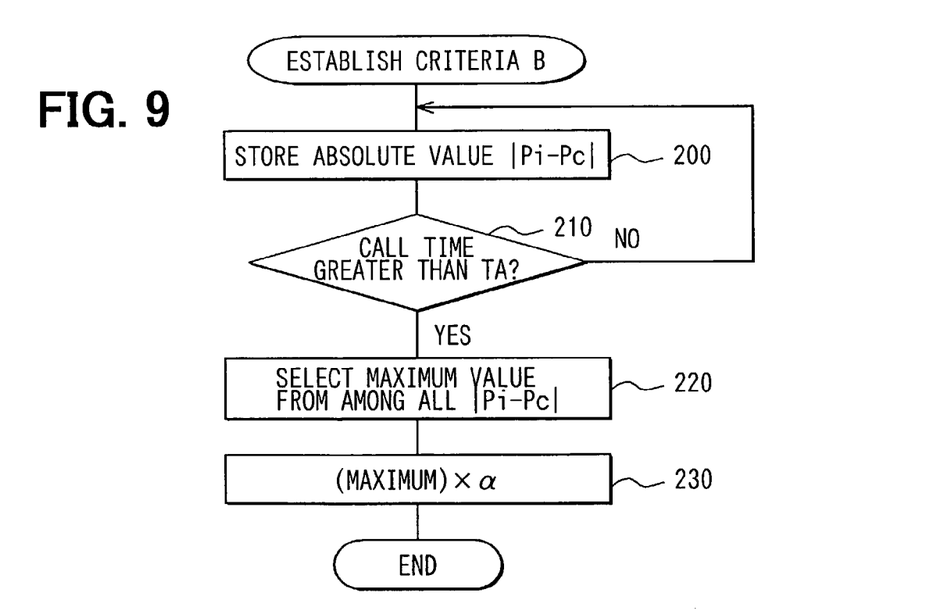
FIG. 9 is a flowchart showing further operation of the microcomputer shown in FIG. 2.

The criteria value determining process in the microcomputer 26*a* for determining criteria B is next described based on FIG. 9. This criteria value determining process is performed in a call interval on the cellular telephone 20 assumed to have no faults occurring. The process is performed for example, in a fixed call interval after first making a call on the cellular telephone 20.

To control the uplink signal transmission power, first of all, the transmission power concentration value Pc is established the same as the process in step 122, each time the initial transmission power value Pi is acquired from the initial value table in the memory 26b. The absolute value |Pi−Pc| for the differential between initial transmission power value Pi and transmission power concentration value Pc is also found for each concentration value and stored in the flash memory of the memory 26b (step 200).

The storing of these |Pi−Pc| values is repeated from the time the call starts through a fixed (for example, 76 hours) call period TA (step 210). When the call period TA then ends, the maximum value from among the |Pi−Pc| values stored in the flash memory of memory 26b is selected (step 220). This maximum value is multiplied by the coefficient α (for example, 1 or 2), and established as criteria (B) (maximum value ×α) and stored in the flash memory 26b (step 230).

In the embodiment described above, when the transmission power concentration value Pc cannot be detected by the transmission power detector 32, transmission power faults can be detected based on the initial transmission power value Pi and transmission power concentration value Pc, so that transmission power faults can be detected without detecting the transmission power.

The example in the embodiment also described detecting power transmission faults on a cellular telephone 20 unit. However the present invention is not limited to this description and test equipment other than the cellular telephone 20 may be utilized if detecting power transmission faults based on the initial transmission power value Pi and transmission power concentration value Pc. In other words, by supplying the initial transmission power value Pi and transmission power concentration value Pc output from the cellular telephone 20 to the test equipment, this test equipment may detect transmission power faults based on the initial transmission power value Pi and transmission power concentration value Pc.

Further, the example in the embodiment described finding multiple absolute value |Pi−Pc| as the differential between the initial transmission power value Pi and transmission power concentration value Pc, and then establishing a criteria B based on the maximum value among these multiple |Pi−Pc|. However, the invention is not limited to this example and the criteria B may be established beforehand by testing and this criteria B then stored in the flash memory of the memory 26b.

Still further, the example in the above embodiment described utilizing a cellular telephone as the radio terminal. However the invention is not limited to this example and different types of radio terminals may be utilized if performing control of the transmission power.

Also, the example in the above embodiment described utilizing the SIR (Signal-To-Interference Ratio) as the receive status for determining the initial transmission power value. However the invention is not limited to this example and the receive power or receive electrical field intensity may be utilized.

Yet further, the example in the above embodiment described finding the criteria B used for detecting transmission power faults by multiplying the maximum value among the |Pi−Pc| by a coefficient. However the invention is not limited to this example and different types of statistical methods may be utilized to find the criteria B.

The memory 26b serves as a storage means, the variable gain amplifier 30 and the transmission amplifier 31 serve as output means, the transmission power detector 32 serves as signal detecting means, the criteria B is also referred to as a threshold value, the processing of step 124 serves as first fault detecting means, and the processing of step 125 serves as a second fault detecting means.

The invention claimed is:

1. A radio terminal with transmission power for transmission to a base station controlled by a base station, wherein the radio terminal comprises:
    means for determining and storing a transmission power concentration value when the transmission power controlled by the base station has been concentrated,
    first fault detecting means for detecting the transmission power fault based on the stored concentration value;
    output means for outputting a signal for transmission to the base station at a controlled transmission power.
    signal detecting means for detecting the signal output from the output means, wherein the first fault detecting means can be used for detecting faults in the transmission power when the controlled transmission power cannot be detected by the signal detecting means; and
    second fault detecting means for detecting transmission power faults based on the signal detected by the signal detecting means when the controlled transmission power is capable of being detected by the signal detecting means.

2. A radio terminal according to claim 1 wherein when the transmission power fault is detected by either the first or the second fault detecting means, the user is notified of the transmission power fault.

3. A radio terminal according to claim 1, wherein the transmission power is controlled based on a specifier signal for specifying an increase or reduction in the initial transmission power value by the base station and by an initial transmission power value specified from the base station, wherein the first fault detecting means detects a fault in the transmission power when the relation between the stored concentration value and the specified initial transmission power value deviates from a specified relation.

4. A radio terminal according to claim 3, wherein the first detecting means detects a fault in the power transmission when the difference between the concentration value and the specified initial transmission power value has become larger than a threshold value, since the relation between the concentration value and the specified initial transmission power value has deviated form the specified relation.

5. A radio terminal according to claim 4, wherein, with the initial transmission power value set based on a signal transmitted from the base station, prior to determining the transmission power concentration value, the transmission power concentration value is found each time the initial transmission power value is set, and along with finding the difference between the initial transmission power value and concentration value for the transmission power, wherein the terminal further comprises a means for establishing the threshold according to each difference that is found.

6. A radio terminal according to claim 3 wherein the transmission power is calculated based on the initial transmission power value and the specifier signal.

7. A radio terminal according to claim 6 wherein the first detecting means detects a fault in the power transmission when the difference between the concentration value and the specified initial transmission power value has become larger than a threshold value, since the relation between the concentration value and the specified initial transmission power value has deviated from the specified relation.

8. A radio terminal according to claim 7 wherein, with the initial transmission power value set based on a signal transmitted from the base station, prior to determining the transmission power concentration value, the transmission power concentration value is found each time the initial transmission power value is set, and along with finding the difference between the initial transmission power value and concentration value for the transmission power, wherein the terminal further comprises means for establishing the threshold according to each difference that is found.

9. A fault detection method for a radio terminal that transmits to a base station, wherein the transmission power of the radio terminal is controlled by the base station, and wherein the method comprises:

storing a concentration value for the concentrated transmission power when the transmission power controlled by the base station is concentrated;

outputting a signal for transmission to the base station at a controlled transmission power;

detecting faults in the transmission power based on the stored concentration value when the controlled transmission power cannot be detected; and detecting faults in the transmission power based on the signal when the controlled transmission power is capable of being detected.

* * * * *

UNITED STATES PATENT AND TRADEMARK OFFICE
CERTIFICATE OF CORRECTION

PATENT NO. : 7,031,674 B2
APPLICATION NO. : 10/261154
DATED : April 18, 2006
INVENTOR(S) : Ryohei Kataoka et al.

It is certified that error appears in the above-identified patent and that said Letters Patent is hereby corrected as shown below:

On the title page, item [75]:

Inventors' residences should be:

Ryohei Kataoka "Kariya" (JP)" should be -- Okazaki (JP) --

Hisashi Takeshita "Chiyoda-ku (JP)" should be --Yokohama (JP). --

Hiroyuki Itazu "Chiyoda-ku (JP)" should be --Yokosuka (JP) --

Mio Okamoto "Chiyoda-ku (JP)" should be --Yokohama (JP) --

Signed and Sealed this

Twenty-second Day of August, 2006

JON W. DUDAS
*Director of the United States Patent and Trademark Office*